(No Model.)
F. BLACK.
AIR PUMP.
No. 514,900.  Patented Feb. 20, 1894.
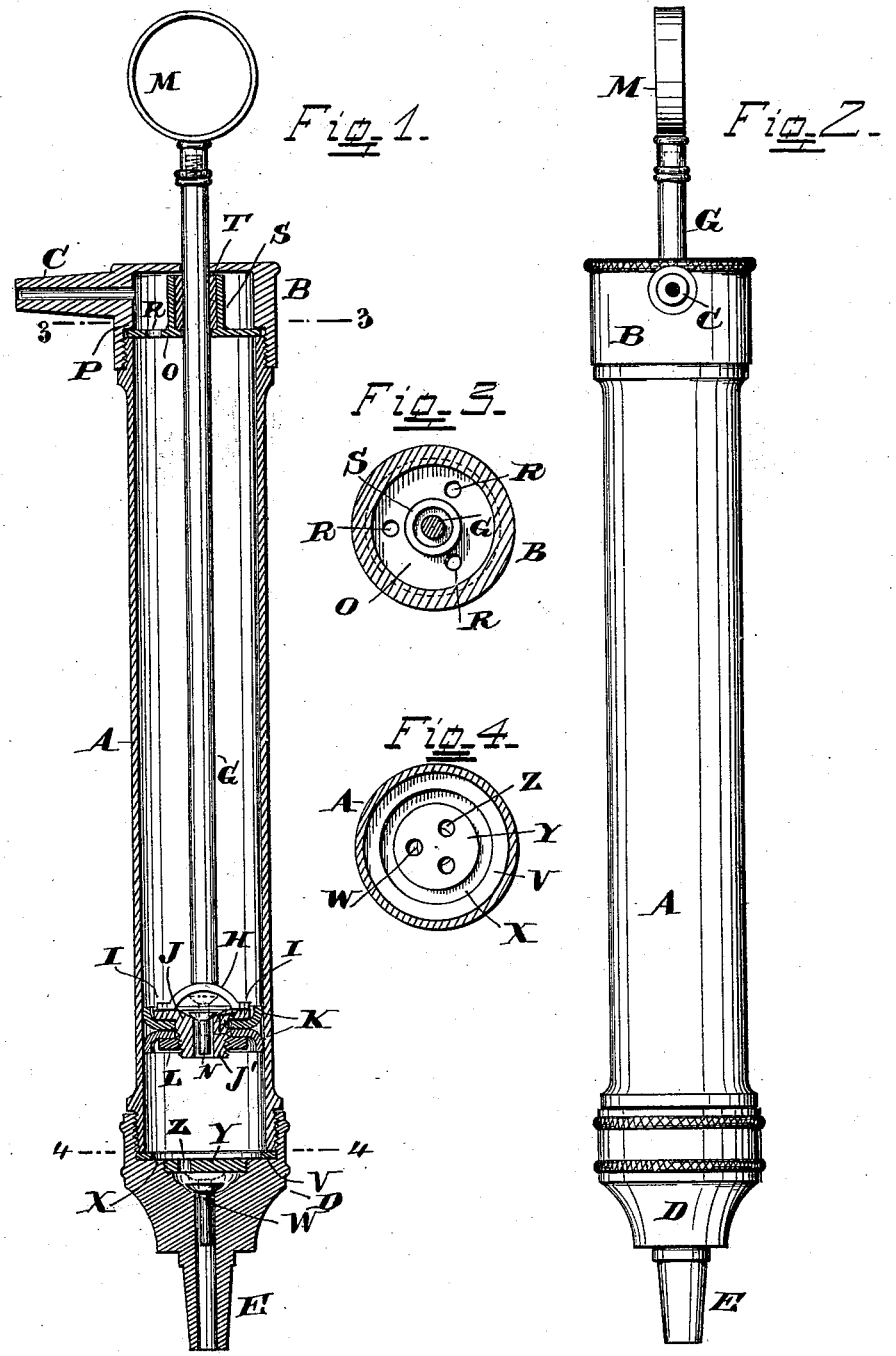
Attest
Fred. Pickering
A. P. Copen
Inventor
Fergus Black
per Jno. W. Prahli
Attorney

UNITED STATES PATENT OFFICE.

FERGUS BLACK, OF UXBRIDGE, CANADA.

AIR-PUMP.

SPECIFICATION forming part of Letters Patent No. 514,900, dated February 20, 1894.

Application filed May 5, 1892. Serial No. 431,937. (No model.)

*To all whom it may concern:*

Be it known that I, FERGUS BLACK, a subject of the Queen of England, residing in the city of Uxbridge, in the Province of Ontario, and in the Dominion of Canada, have invented certain new and useful Improvements in Air-Pumps, of which the following is a specification.

My invention belongs to that class of air pumps in which an exhaust and a force pump are combined in one. By its use with attachments it takes the place of many separate expensive pumps and devices. It is compact, easily operated, simple of construction, cheap of manufacture and efficient in use. The pump is solely used for pumping air.

In the accompanying drawings forming part of this specification, Figure 1 is a central longitudinal cross section of my improved pump; Fig. 2 a view of same in elevation; Fig. 3 a cross section taken at the line 3—3 of Fig. 1 and Fig. 4 a cross-section taken at the line 4—4 of Fig. 1.

In the drawings A represents a cylinder or casing, made of hard rubber, gutta percha, celluloid or similar material. At each end this cylinder A is screw threaded receiving at its upper end a screw threaded cap B having an outlet tube C and receiving at its lower end a cap D having an inlet tube E. These tubes C and E are preferably made integral with said caps.

In the cylinder A works the piston, composed of piston rod G, secured at its lower end by means of arms H and bolts I to the washer J; and packing rings K. The washer J has a depending screw threaded head J' on which the nut L is screwed. Thus the two rings K are firmly held in place. These parts viz: washer J, packing rings K, and nut L combined as set forth form the piston head. At its upper end the piston rod G is screw threaded carrying the thumb ring M, which is screwed therein.

In the piston head is located a valve N. This valve is preferably T shaped. It works up and down in an opening in the depending screw threaded head J' of the washer J, the valve being seated on the washer J, as shown. The arms H keep the valve from passing upward too far, the dotted lines showing the limit of the upward movement of the valve N.

On the upper part of the cylinder A rests a diaphragm O. This diaphragm O is securely held in place when cap B is in place as the shoulder P on the cap impinges against the diaphragm. This diaphragm O has one or more holes or openings R passing through it as shown. The diaphragm O carries a stuffing cup S on its upper side as shown, said cup being preferably made integral therewith.

T represents the stuffing in the cup S. Any suitable packing may be used cotton batting being preferred. The diaphragm and cup may be made of any desired material and of any suitable shape. The piston rod G passes through the cup S and diaphragm O. The cap D is recessed on the inside as shown and peculiarly shaped to form a seat for the valve W. This valve W is shaped similar to valve N and works up and down in tube E. The shoulders X on the cap D are screw threaded receiving the screw threaded disk Y having the openings Z; which disk serves as a stop for the upward movement of the valve W and is removed with the cap D without the necessity for taking out the valve, when the cap is disconnected from the body.

V represents a ring or washer interposed between the end of the cylinder A and the cap D.

By the use of this pump, the efficiency of the following instruments is increased and their cost lessened. It may be connected to some of them directly and to others by hose connection or the like. The instruments referred to are: cupping apparatus, breast pump, aspirator, instrument for passing the catheter, enema, uterine and vaginal irrigator, instrument for local treatment of the bladder, stomach pump and air compressor. As it can be used in so many ways in connection with other instruments, I will explain its use in one instance as an exhaust pump and in another instance as a force pump, as this will be sufficient to demonstrate its usefulness and how it operates. Suppose it is desired to remove the pus or matter from an abcess. A hollow needle connected to a short hose pipe is inserted into the abcess, the free end of the short hose pipe being inserted into a bottle or other vessel into which it is desired to draw the pus. Into this same bottle is inserted one end of another short hose pipe, its opposite end being connected to the tube E. The pump is held in the hand and the thumb inserted into the thumb ring M and the piston worked up and down. By this upward working of the piston the air in the bottle to which the hose pipes are connected is drawn through the pipe connected directly to the pump, through the tube E, the suction raising the valve W allowing the air to pass through into the cylinder. When the piston is borne down, valve W closes and finds its seat, the valve N leaving its seat as shown by dotted lines, forcing the air through the same into the upper part of the cylinder, when it is forced out through openings R in the diaphragm O, it then finding its way out by means of tube C. This upward and downward motion is continued until the air in the bottle or other vessel into which it is desired to draw the pus has been exhausted, the pus will then be drawn into the vessel out of which the air has been drawn. This shows the working of the pump as an exhaust.

I will now give an illustration of a force pump in compressing air. Suppose we have a tight box or small tank in which we wish to compress air. One end of a hose is connected to this box or tank, the other end of said hose being connected to tube C of the pump. The piston is now worked up and down, the upward motion of the piston drawing air into the cylinder through tube E, the valve W leaving its seat allowing the air to pass into the cylinder. By the downward motion of the piston the air is forced through the valve N into the upper part of the cylinder, where the air passes through holes in the diaphragm and is forced out through the tube C, through the hose into the box or tank, a valve in the hose near the pump cutting off or opening connection with the box or tank. The valves W and N leave their seats respectively by the upward and downward movement of the piston and find their seats respectively by the downward and upward movement of the piston. The stuffing T in the cup S prevents the air from passing through the central holes in the diaphragm and cap B, making the piston rod work air tight. The cup S is supported by the diaphragm O, and when the cap B is taken off the piston rod G and stuffing box S can be removed without the necessity for separating them.

What I claim as new and of my invention, and desire to secure by Letters Patent of the United States, is—

1. In a pump, the combination with the valved piston, the piston rod connected therewith, and the cylinder inclosing said piston and rod and having exterior threads at its upper end; of a cap having an outlet and provided with an interior shoulder below which it is threaded to connect with the threads on the cylinder, said cap having a hole for the passage of the rod, a perforated diaphragm clamped between said shoulder and the upper end of the cylinder, a cup supported by the diaphragm around said rod, and stuffing within the cup, as and for the purpose set forth.

2. In a pump, the combination with a cylinder having an exteriorly threaded lower end, and a valved piston reciprocating within the cylinder; of a cap having an interior shoulder with a flat upper and a threaded inner face, the inner wall of the cap being threaded above said shoulder to fit on the threads of the cylinder, a ring clamped between the lower end of the cylinder and the flat face of said shoulder, a perforated disk having threads on its edge and removably screwed into the threads within the shoulder, and a valve working within the cap below said disk which latter serves to limit the opening of the valve, as and for the purpose set forth.

FERGUS BLACK.

Witnesses:
FRED. PICKERING,
WILSON B. BRICE.